(12) United States Patent
Hallundbæk

(10) Patent No.: US 11,745,793 B2
(45) Date of Patent: Sep. 5, 2023

(54) BUS STEERING SYSTEM

(71) Applicant: Alpha EC Industries 2018 S.à.r.l., Luxembourg (LU)

(72) Inventor: Jørgen Hallundbæk, Luxembourg (LU)

(73) Assignee: Alpha EC Industries 2018 S.à.r.l., Luxembourg (LU)

( * ) Notice: Subject to any disclaimer, the term of this patent is extended or adjusted under 35 U.S.C. 154(b) by 631 days.

(21) Appl. No.: 16/775,732

(22) Filed: Jan. 29, 2020

(65) Prior Publication Data

US 2020/0239068 A1  Jul. 30, 2020

(30) Foreign Application Priority Data

Jan. 29, 2019 (LU) .......................... 101111

(51) Int. Cl.
| | |
|---|---|
| B62D 7/14 | (2006.01) |
| B60K 7/00 | (2006.01) |
| B62D 5/04 | (2006.01) |
| B62D 47/02 | (2006.01) |

(52) U.S. Cl.
CPC ............ B62D 7/144 (2013.01); B60K 7/0007 (2013.01); B62D 5/0418 (2013.01); B62D 47/025 (2013.01); *B60K 2007/0092* (2013.01)

(58) Field of Classification Search
CPC . B60G 3/04; B62D 7/144; B62D 7/06; B62D 7/18; B60K 2007/0092
See application file for complete search history.

(56) References Cited

U.S. PATENT DOCUMENTS

| | | | |
|---|---|---|---|
| 1,710,616 | A | 4/1929 | Guernsey |
| 4,393,955 | A | 7/1983 | Van Mullem |
| 4,469,369 | A | 9/1984 | Belik et al. |
| 4,934,733 | A | 6/1990 | Smith et al. |

(Continued)

FOREIGN PATENT DOCUMENTS

| | | | |
|---|---|---|---|
| CN | 102673380 A | * | 9/2012 |
| CN | 203427870 U | | 2/2014 |

(Continued)

OTHER PUBLICATIONS

Knoll et al., Suspension Arrangement, Dec. 1, 2016, EPO, DE 10 2015 209 595 A1, Machine Translation of Description (Year: 2016).*

(Continued)

*Primary Examiner* — James A English
(74) *Attorney, Agent, or Firm* — Rankin, Hill & Clark LLP

(57) ABSTRACT

A steering unit for a vehicle, notably a bus. The steering unit is coupled with a suspension system and comprises: a support formed by a passenger platform and a wheel housing, a longitudinal axis, a steering knuckle with an in-wheel engine defining a transversal rotation axis which is arranged transversally with respect to the longitudinal axis, an actuator mechanism adapted for pivoting the steering knuckle. The steering knuckle further comprises a lever which is linked to the actuator mechanism and which includes a transversal portion extending transversally along the in-wheel engine. The steering unit is adapted for an articulated bus with at least two bodies, said bodies each exhibits four or eight identical and independent steering units.

17 Claims, 8 Drawing Sheets

(56) References Cited

U.S. PATENT DOCUMENTS

| | | | |
|---|---|---|---|
| 5,161,813 A * | 11/1992 | Yamashita | B60G 15/07 180/428 |
| 6,276,474 B1 | 8/2001 | Ruppert et al. | |
| 6,354,616 B1 | 3/2002 | Morin et al. | |
| 6,561,307 B1 | 5/2003 | Brill et al. | |
| 9,731,572 B2 | 8/2017 | Tamura et al. | |
| 10,960,723 B1 * | 3/2021 | Hall | F16F 15/005 |
| 2003/0040979 A1 | 2/2003 | Borroni-Bird et al. | |
| 2003/0111834 A1 | 6/2003 | Ledesma et al. | |
| 2004/0012162 A1 | 1/2004 | Burke | |
| 2004/0036266 A1 | 2/2004 | Tardini | |
| 2006/0048978 A1 | 3/2006 | Nagaya | |
| 2006/0214408 A1 | 9/2006 | Davey | |
| 2006/0237242 A1 * | 10/2006 | Burke | B62D 31/025 180/65.265 |
| 2011/0209938 A1 | 9/2011 | Basadzishvili | |
| 2014/0062043 A1 | 3/2014 | Boterdaele et al. | |
| 2014/0300082 A1 | 10/2014 | Szabo | |
| 2014/0353054 A1 * | 12/2014 | Matayoshi | B62D 7/08 180/55 |
| 2015/0122560 A1 | 5/2015 | Elrabaa | |
| 2016/0090134 A1 * | 3/2016 | Niu | B60K 1/04 180/22 |

FOREIGN PATENT DOCUMENTS

| | | |
|---|---|---|
| CN | 203996512 U | 12/2014 |
| CN | 106627102 A | 5/2017 |
| CN | 107415675 A | 12/2017 |
| CN | 107963124 A | 4/2018 |
| CN | 207207729 U | 4/2018 |
| DE | 102006037588 A1 | 2/2008 |
| DE | 102015209595 A1 | 12/2016 |
| EP | 1147927 A1 | 10/2001 |
| EP | 1170162 A1 | 1/2002 |
| EP | 2338764 A1 | 6/2011 |
| EP | 3028927 A1 | 6/2016 |
| FR | 2776966 A1 | 10/1999 |
| GB | 2441655 A | 3/2008 |
| JP | 2008-168803 A | 7/2008 |
| JP | 2015-20586 A | 2/2015 |
| KR | 200270848 U | 4/2002 |
| WO | 2004/067358 A1 | 8/2004 |
| WO | 2016/161216 A1 | 10/2016 |

OTHER PUBLICATIONS

Yatao Luo, Built-in and suspension integrated hub motor drive electric wheel, Sep. 19, 2012, EPO, CN 102 673 380 A, Machine Translation of Description (Year: 2012).*

Luxembourg Search Report/Written Opinion dated Sep. 20, 2019, 9 pages.

U.S. Office Action from corresponding application U.S. Appl. No. 16/775,699, dated Nov. 14, 2022, 30 pages.

* cited by examiner

BUS STEERING SYSTEM

TECHNICAL FIELD

The invention lies in the field of vehicle steering units. The invention provides a steering unit for a vehicle, wherein the steering units includes a steering knuckle receiving an in-wheel engine adapted for driving said vehicle. The invention also provides a mass transportation vehicle, notably a bus, with steering units.

BACKGROUND OF THE INVENTION

A vehicle, notably a bus, is dotted with steering units in order to drive it along accurate curves. In order to improve drive capacity, the or each steering unit includes an inner engine connected to the wheel. However, this engine requires an important place within the steering knuckle, and reduces the angle about wheel the steering unit may pivot the steered wheel.

Consequently, the manoeuvrability of the vehicle is reduced, which at a certain point, may render the latter unsuitable to cities with narrow streets which communicate through sharp crossroads. A solution in order to address the current solution would be to reduce the size of the engines. Yet, it reduces their maximal power and prevents use on motorways.

Then, there is a need for providing a compromise between the steering angle and the capacities of a vehicle. The weight is also a concern of the prior art in addition to the abilities.

The document EP 1 170 162 A1 discloses a directional axle for coupling the drive wheels in vehicles. Two steering units includes wheels, knuckles, and motor reducers outside the knuckles 3. As apparent from FIG. 9, the knuckles exhibit side levers with biased portions and transversal portions which are at distance from the motor reducers.

The document FR 2 776 9% A1 disclose a wheel with several in-wheel engines. The engines have rotation axes which longitudinally are offset with respect to the wheel rotation axis. The engines are between, the rim and a gear.

The document JP 2015 020 586 A discloses a vehicle with four steering units. The in-wheel engine comprises a rotation axis which is vertically offset with regard to the wheel rotation axis. An actuator controls the orientation of the knuckle, and meshes with a vertical shaft thereof.

Technical Problem to be Solved

It is an objective of the invention to present a device, which overcomes at least some of the disadvantages of the prior art.

SUMMARY OF THE INVENTION

According to a first aspect of the invention a steering unit is provided. The steering unit, notably for a bus, the steering unit comprising: a longitudinal axis, a steering knuckle with an in-wheel engine exhibiting a transversal rotation axis which is arranged transversally with respect to the longitudinal axis, an actuator mechanism adapted for pivoting the steering knuckle, the steering knuckle comprising a lever which is linked to the actuator mechanism and which includes a transversal portion extending transversally along the in-wheel engine.

Preferably, the steering unit comprises a brake disk; the lever, notably the transversal portion, extending transversally toward the opposite direction of the brake disk.

Preferably, the steering knuckle comprises a main body, notably between the in-wheel engine and the brake disk, the lever further comprising a first longitudinal portion connecting the transversal portion to the main body.

Preferably, the lever further comprises a second longitudinal portion connecting the transversal portion to the main body, the in-wheel engine being disposed transversally between the first longitudinal portion and the second longitudinal portion.

Preferably, the knuckle includes an inboard plate, the in-wheel engine being disposed between the inboard plate and the main body.

Preferably, the steering unit further comprises an upper arm and a lower arm which are pivotably mounted to the steering knuckle, at least one of the upper arm and the lower arm being adapted for being pivotably fixed to a platform or a wheel housing of the bus.

Preferably, the steering unit further comprises a wheel with a rim in which the steering knuckle is disposed, the rim including an inner cavity in which the transversal portion possibly extends.

Preferably, the actuator mechanism includes an actuator device and a tie rod, said tie rod connecting the lever to the actuator device, and possibly the transversal portion to the actuator device.

Preferably, along the transversal rotation axis, the transversal portion includes an inboard end and/or an outboard end transversally at distance from the electric engine.

Preferably, the actuator mechanism is disposed below the transversal rotation axis, and preferably vertically at distance from the transversal rotation axis. Then, the actuator is closer to the ground for a better cooling. Where the steering unit is dotted with a damping system and swivelling arms, vertical oscillations only act in one steering direction. Thus, cinematic is easier to manage.

Preferably, the actuator mechanism includes a sliding bar with a sliding direction, the sliding direction and the transversal rotation axis define an angle ($\beta$) ranging from: 15° to 45°, 10° to 30°, or 5° to 60°.

Preferably, the steering knuckle comprises an upper ball joint and a lower ball joint vertically at distance from the transversal portion.

Preferably, the steering unit includes a longitudinal beam and/or a horizontal beam, with a transversal hole, the actuator mechanism being arranged in said transversal hole, possibly the sliding bar slides through said transversal hole.

Preferably, the in-wheel engine comprises a first portion, notably an in-board portion, inside the wheel; and a second portion, notably an outboard portion, outside the wheel.

Preferably, the in-wheel engine is in contact of the steering knuckle.

Preferably, the steering knuckle defines an inner space in which the in-wheel engine is disposed.

Preferably, the in-wheel engine is an electric engine.

Preferably, the in-wheel engine is configured for rotating the wheel, notably for driving a vehicle, possibly the bus.

Preferably, the actuator mechanism, notably the actuator device and/or the tie rod, is vertically level with the in-wheel engine.

Preferably, the actuator mechanism is an electric actuator mechanism.

Preferably, the transversal portion is partially outside the in-wheel engine.

Preferably, the actuator mechanism is vertically and/or longitudinally level with the rim.

Preferably, the sliding bar is adapted for sliding through the transversal hole.

Preferably, the beam to which the actuator mechanism is fixed is at least one of a longitudinal beam, a transversal beam or a biased beam with respect to the longitudinal direction.

Preferably, the beam to which the actuator mechanism is fixed is a horizontal beam.

Preferably, the lower plate and the upper plate are facing each other.

Preferably, the transversal portion is disposed vertically between the upper arm and a lower arm.

Preferably, the wheel is a driving wheel.

Preferably, the wheel and the in-wheel engine have parallel, and/or colinear, and/or coaxial, and/or the same transversal rotation axis.

Preferably, the transversal portion is attached to and/or in contact of the actuator mechanism, notably to/of the tie rod.

Preferably, along the rotation axis, the transversal portion overlaps the in-wheel engine, and/or is longer than the in-wheel engine.

Preferably, the transversal portion is at a greater distance from the transversal rotation axis than the in-wheel engine.

Preferably, the steering knuckle is monobloc.

Preferably, the steering unit further comprises a support, notably a passenger platform portion and/or a wheel housing portion, the steering knuckle pivoting with respect to said support about a substantially vertical pivot axis.

Preferably, the longitudinal portion crosses and/or longitudinally overlaps the in-wheel engine.

Preferably, the upper ball joint and the lower ball joint are within the rim.

Preferably, the actuator mechanism includes a sliding bar with a sliding direction which is inclined with respect to the longitudinal direction of an angle ($\alpha$) ranging from 45° to 80°, preferably from 46° to 75°.

Preferably, the lever and the actuator mechanism include a control joint vertically level with the in-wheel engine, and/or within the wheel, and/or within the rim.

Preferably, the in-wheel engine comprises a stator rigidly fixed to steering knuckle, possibly to the main body and/or to the inboard plate.

Preferably, the outer diameter of the in-wheel engine is greater than the outer diameter of the brake disk.

Preferably, the first longitudinal portion is perpendicular to the transversal rotation axis of the in-wheel engine.

Preferably, the lever is longitudinally at distance from the in-wheel engine.

Preferably, the transversal hole is longitudinally at distance from the steering knuckle, and/or from the in-wheel engine, from and/or from the lever, and/or from the rim.

Preferably, the passenger platform and/or the horizontal beam is below the transversal rotation axis.

Preferably, the longitudinal portion extends longitudinally and/or radially along the in-wheel engine.

Preferably, the steering unit comprises a wheel with an inner cavity, optionally formed by a rim of the wheel.

Preferably, the steering knuckle comprises an upper ball joint and/or a lower ball joint which is/are in the inner cavity.

Preferably, the steering knuckle comprises an upper joint and/or a lower joint which is/are in the inner cavity.

Preferably, the joint(s), notably the ball joints, is/are separate and distinct from the lever.

Preferably, the joint(s), notably the ball joints, is/are at distance from the lever, for instance vertically and/or longitudinally and/or transversally at distance from the lever.

Preferably, the longitudinal portion is disposed angularly level with the in-wheel engine, notably about the wheel rotation axis.

Preferably, the first longitudinal portion and/or the second longitudinal portion is angularly level with the in-wheel engine.

It is another aspect of the invention to provide a steering unit, notably for a bus, the steering unit comprising: a transversal axis, a steering knuckle with an in-wheel engine exhibiting a transversal rotation axis, an actuator mechanism being adapted for swivelling the steering knuckle, the steering knuckle exhibiting a lever which is linked to the actuator mechanism and which includes a transversal portion transversally overlapping the in-wheel engine.

It is another aspect of the invention to provide a bus comprising at least one steering unit, preferably a plurality of steering units, the steering unit or each steering unit being in accordance with the invention, preferably the bus comprises a passenger platform.

Preferably, the actuator mechanism is arranged within the passenger platform, the vertical thickness of the passenger platform possibly representing at most two times the vertical thickness of the actuator mechanism.

Preferably, the passenger platform; optionally the beam, notably the horizontal beam; comprises a transversal hole, the actuator mechanism being connected to the steering knuckle through said transversal hole.

Preferably, the passenger platform includes a lower plate and an upper plate in contact of a beam to which the actuator mechanism is fixed.

Preferably, the upper plate forms the passenger floor of the passenger platform and spans over at least the half of the surface of a passenger compartment of the bus, the upper plate being distant of at most: 50 cm, or 40 cm from the ground.

Preferably, the bus is an articulated bus comprising at least two articulated bodies, each body comprising at least four, or at least eight identical steering units.

Preferably, the steering units are independent from one another.

Preferably, the steering units are disposed by pairs in at least one or in each wheel housing.

Preferably, the actuator mechanisms of the bus are independent from one another.

Preferably, the steering units of the bus are identical.

Preferably, the vertical thickness TH of the platform is of at most: 15 cm, or 10 cm, or 8 cm.

Preferably, the passenger platform and/or the horizontal beam is below the transversal rotation axis.

It is another aspect of the invention to provide a bus comprising a passenger platform with a beam exhibiting a hole, and a steering unit linked to said beam and comprising a steering knuckle; the bus further comprising an actuator disposed within the passenger platform and controlling the steering angle of the knuckle through the hole and/or through the platform, the bus possibly forming a steering unit in accordance with the invention.

The different aspects of the invention may be combined to each other. In addition, the preferable options of each aspect of the invention may be combined with the other aspect of the invention, unless the contrary is explicitly mentioned.

Technical Advantages of the Invention

The invention provides a solution adapted for steering a wheel dotted with an in-wheel engine and a steering knuckle also within the wheel. The lever according to the invention is adapted for the space between the rim and the in-wheel engine, an provides a junction starting from the steering knuckle to the final actuator dedicated to the steering unit.

The invention offers an accurate position of the control joint with respect to the in-wheel engine. The position of the control joint suggested by the invention enables a wide steering angle where the in-wheel engine exhibits a large outer diameter. Thus, the equipped vehicle may reach high speed whereas its turning radius may be reduced. Thus, these two parameters may be optimized together. The size and the position of the in-wheel engine may be handled even with rims of reduced diameter in order to increase the size of the tire, and consequently the passenger comfort.

The position of the actuator device within the passenger platform enables a transversal arrangement, and notably a transversal sliding direction. Consequently, the steering angle may be controlled more efficiently, and notably with a reduced number of cranks. Thus, the steering unit become more reliable, and safer. Providing a transversal hole through a beam or support of the passenger platform allows an adaptation of the actuator mechanism to a compact environment, which notably correspond to a low floor and a thin passenger platform. As a reminder, a thin passenger platform with a low floor eases the access to a bus, and avoids steps at the doors of the bus.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the steering unit in accordance with the invention is evidently connected to a power supply, even though such power supply is not explicitly referenced on the figures nor referenced in the description.

In the current description, the longitudinal direction may correspond to the main elongation of the vehicle, and/or the main driving direction. The transversal direction is transversal to the longitudinal direction, for instance perpendicular. The term "radially" corresponds to perpendicularly with respect to an association rotation axis. The words "inboard" and "outboard" may correspond to a position with respect to the vehicle centre line, for instance the word "outboard" may toward the environment of the vehicle. These words may be considered along the transversal direction.

Figure 1:
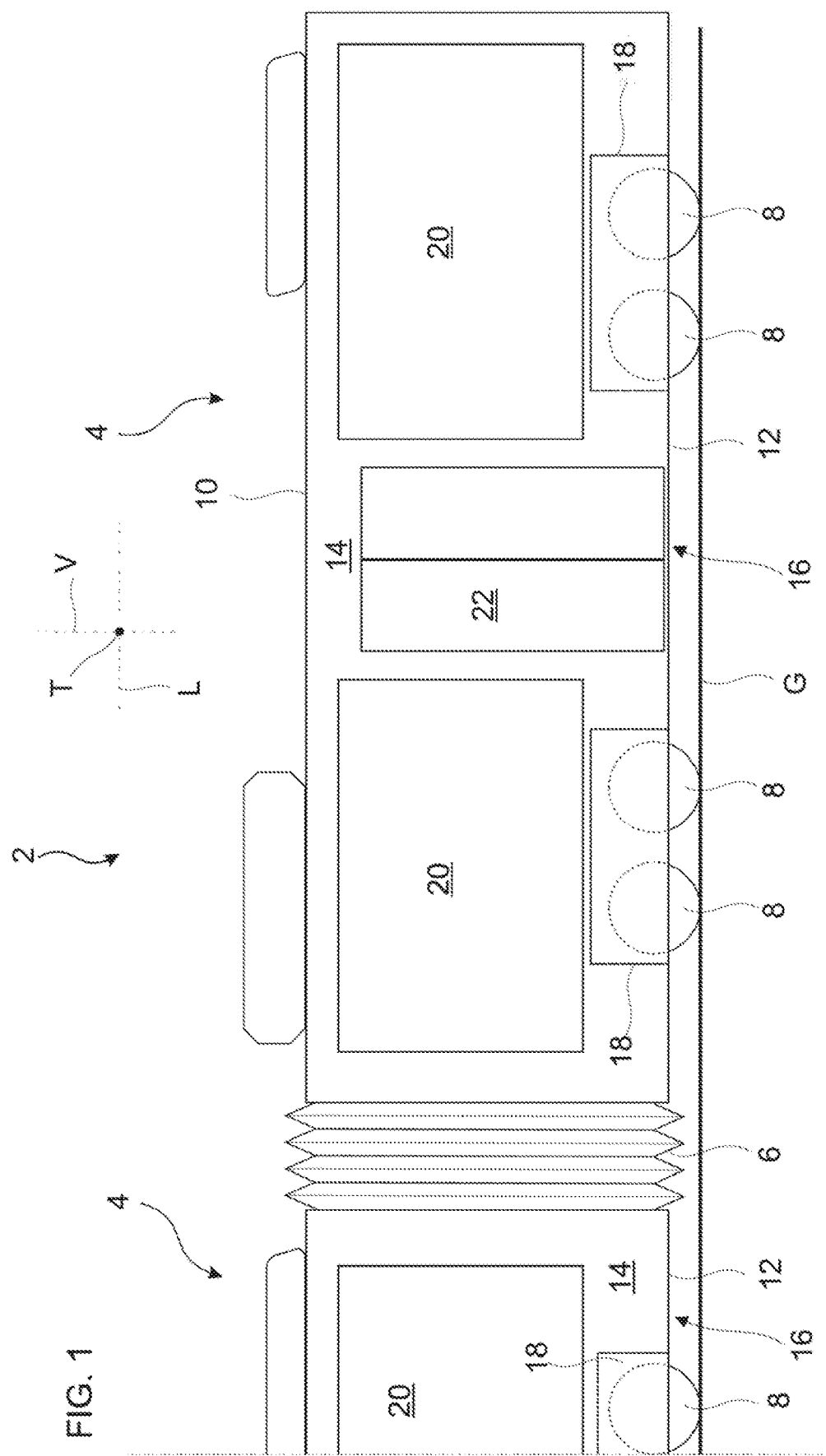
FIG. 1 provides a schematic illustration of a side view of a bus in accordance with a preferred embodiment of the invention.

FIG. 1 shows a vehicle for mass transportation. The longitudinal axis L, the transversal axis T and the vertical axis V are provided for the sake of clarity.

The vehicle is adapted for transportation of passengers in cities and may transport about one hundred passengers, for instance one hundred and twenty passengers. The vehicle may be a bus 2, notably an electric bus 2. The bus 2 may include electric driving engines and electric batteries (not represented) powering the electric driving engines. The bus 2 may be exclusively driven by electric power.

The bus 2 may be an articulated bus. It may comprise a first body 4 and a second body 4 (partially represented). Each body 4, may form a passenger cart, and/or may form a rigid element. Each body 4 may be a trailer and/or a tractor. Each body 4 may be self-supporting. The bodies 4 may be similar or identical. These bodies 4 may be joined by a connection, for instance a hinged connection 6 enabling the bodies 4 to swivel with respect to each other. In the current illustrative example, only two bodies 4 are represented, however it is contemplated in the current invention that the electric bus 2 includes three, four, or more bodies 4, which are linked and articulated by hinged connection 6. Then, the passenger capacity may be of more than two hundred.

A bus formed of a single body is also considered.

Each body 4 may include several wheels 8 engaging the ground G. Pairs of symmetric wheels 8 may form axles, for instance four axle for each body 4. The axles and thus the wheels 8 may be distributed along the length of the bus 2. At least one pair of wheels is formed of steered wheels.

Optionally, each wheel 8 of the bus 2 or of at least one body 4 are steered wheels. The steered wheels may be part of steering units. The wheels 8, notably the steered wheels, may be driving wheels; and possibly suspended wheels.

The bus 2 may include a structure. The structure may include a roof 10, and/or a passenger platform 16, and/or side walls 14. Two transversally opposite side walls 14 may go down from the roof 10 to the passenger platform 16 which may be part of the bus structure. The side walls 14 may form the bodywork of the bus 2.

For instance; the side walls 14 may close the wheel housings 18. The latter may notably receive the wheels 8 by couples. Optionally, at least one or each wheel housing 18 may receive two longitudinally spaced wheels 8. The wheel housings 18 may form downwardly open boxes.

The side walls 14 may receive windows 20. Optionally, doors 22 are be arranged in one of the two side walls 14, notably between windows 20.

As an alternative, each wheel is received in an independent wheel housing.

Figure 2:
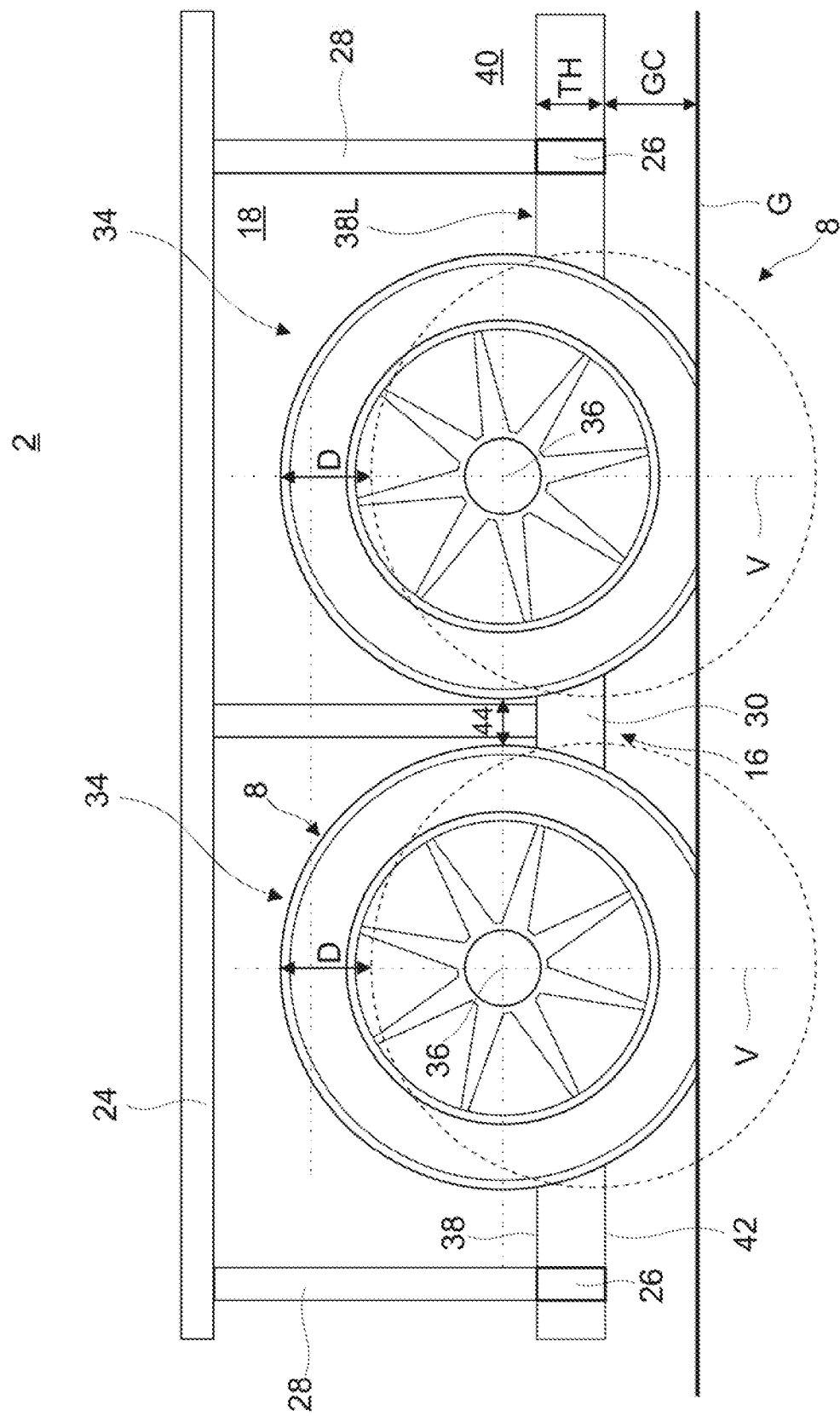
FIG. 2 provides a schematic illustration of a side view of a wheel housing with two steering units in accordance with a preferred embodiment of the invention.

FIG. 2 provides a schematic illustration of a portion of the bus 2. The portion is centred about a wheel housing 18. The wheel housing 18 may receive at least one or at least two wheels 8. The bus may correspond to the bus 2 as described in relation with FIG. 1.

The wheel housing 18 may be a left one or a right one. Its upper end may be delimited by the transversal outer beams 24, and the longitudinal ends may be formed by the transversal bars 26. The latter may be connected to the transversal outer beams 24 by means of vertical bars 28. The passenger platform 16, and notably a longitudinal beam 30, are apparent in the background, notably behind the wheels 8. The longitudinal beam 30 may be a main longitudinal beam. The "main" aspect may be understood in that the longitudinal beam 30 is the thickest of the passenger platform 16.

The wheels 8 it may be movable with respect to the passenger platform 16, notably through a steering unit 32. The wheels 8 may pivot about a vertical pivot axis. The steering unit 32 may allow a pivot motion of each wheel 8 about a substantially vertical axis V. At least one or each steering unit 32 may be coupled to a suspension system 34. With respect to the passenger platform 16, the wheels 8 may be movable between an upper position (currently represented in solid lines) and a lower position (virtually represented in dotted lines). These positions, or configurations, may respectively correspond to a boarding position where the passenger platform 16 is lowered in order to ease access to the passenger compartment, and a driving position where the ground clearance GC is increased in order to avoid striking an obstacle on the ground G.

In the currently represented upper position, the rotations axis/axes 36 may be over the passenger platform 16. The rotation axis/axes 36 may be vertically distant from the passenger platform 16, and thus of its top surface 38. The top surface 38 may exhibit a main level 38L. The main level 38L may correspond to the average level of the floor surface of the passenger platform 16. The rotations axis/axes 36 may be vertically level with the passenger compartment 40.

In the lower position of the wheel(s) 8, the rotation axis/axes 36 may be vertically level with the passenger platform 16. The rotation axis/axes 36 may be vertically level with the longitudinal beam 30 and/or the transversal beams 24. The rotation axis/axes 36 may be below the main level 38L.

The rotation axis/axes 36 may be vertically above the lower plate 42 of the passenger platform 16, in the lower position as in the upper position.

The distance D between the upper position of the wheels 8 and the lower position may be greater than the thickness TH of the passenger platform 16. The distance D may be measured at the top of the wheels 8. The thickness TH may be constant along one or the two wheels 8. The thickness TH may be constant TH all along the wheel housing 18.

The longitudinal distance 44 between the right wheel and between the left wheel may be smaller than the distance D between the upper position and the lower position. This longitudinal distance 44 may be measured between a couple of wheels 8, on the left side and/or on the right side of the bus. The longitudinal distance 44 may be measured in the upper position and/or in the lower position.

The current description refers to a single wheel housing 18. However, the current teaching may apply to several, or to all the wheel housings of the bus; respectively the vehicle.

Figure 3:
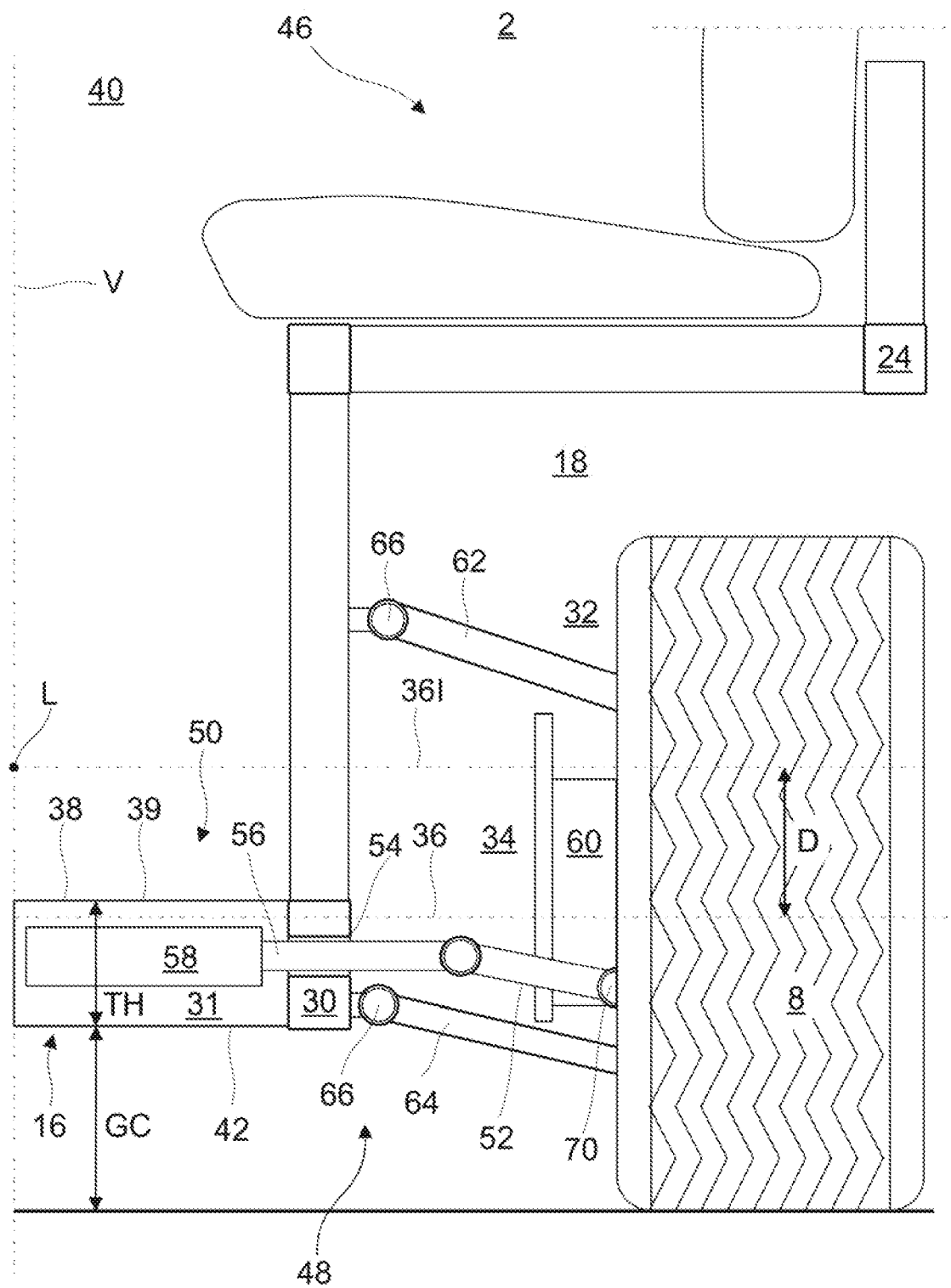
FIG. 3 provides a schematic illustration of a longitudinal view of a steering unit in accordance with a preferred embodiment of the invention.

FIG. 3 provides a schematic illustration of a steering unit 32 along the longitudinal axis L. The steering unit 32 may correspond to the one as described in relation with FIG. 2.

The steering unit 32 is currently represented in the lower configuration, and an illustration of the upper configuration is provided through an illustrative rotation axis 361 of the wheel 8. Distance D illustrates the course of the rotation axis 36 between the lower position and the upper position. The bus 2 may be generally symmetric with respect to a sagittal plan. Said sagittal plan may include the longitudinal axis L and the vertical axis V.

The currently represented right steering unit 32 may be connected to a left steering unit (not represented) by the passenger platform 16.

A seat 46 may be disposed above the steering unit 32, and over the wheel 8. The wheel housing 18 may be arranged bellow the seat 46. The transversally outer beams 24 may span longitudinally over the wheel 8. The wheel housing 18 may separate the passenger compartment 40 from the wheel 8. The platform 16 defines the ground clearance GC, which may be greater than thickness TH of the passenger platform 16.

The transversal beam 31 (partially represented) and the longitudinal beam 30 of the passenger platform may exhibit a same vertical thickness TH. The distance D between the upper position and the lower position may larger than the thickness TH, notably the average thickness or the maximal thickness, of the passenger platform 16.

The steering unit 32 may comprise an actuator mechanism 48. The actuator mechanism 48 may be vertically within the thickness TH of the passenger platform 16. The actuator mechanism 48 may comprise an actuator device 50 and a tie rod 52.

The actuator device 50 may convert an energy supply into a mechanical effort. It may be an electric actuator, and possibly a hydraulic actuator. The actuator device 50 may be a mover. The actuator device 50 may cross a beam, notably a horizontal and/or longitudinal beam. It may cross the longitudinal beam 30 delimiting the wheel housing 18. The actuator device 50 may project within the wheel housing 18.

The longitudinal beam 30 may exhibit a hole 54, for instance a transversal hole 54. The hole 54 may cross transversally the longitudinal beam 30. The actuator device 50 may cross said hole 54. More precisely the actuator device 50 may comprise a sliding bar 56. The sliding bar 56 may slide through the hole 54. The actuator device 50 may comprise a main part 58 receiving the sliding bar 56. The main part 58 may be fixed to the passenger platform 16, for instance to one horizontal beam therein. It may be fixed to the transversal beam 31, and/or a longitudinal beam. It may be fixed an upper plate 39 forming the top surface 38, notably the passenger floor, and/or to a lower plate 42 forming the bottom surface.

The actuator mechanism 48 may be disposed between the top surface 38 and the lower plate 42. The tie rod 52 may be outside the passenger platform 16. The tie rod 52 may connect the sliding bar 56 to a steering knuckle (not represented). The latter may be arranged in the wheel, and may receive an engine, for instance an in-wheel engine 60. The in-wheel engine 60 may project outside the wheel 8. It may fill a sub portion of the wheel housing 18. This arrangement permits to use bigger and more powerful engines, however free space inside the wheel housing reduces.

The in-wheel engine 60 and the wheel 8 have coaxial rotation axes. They may have a same rotation axis. Thus, compactness is improved and the engine is easier to arrange within the wheel. More place is dedicated for the engine such that its maximum torque increases.

The steering knuckle may comprise a control joint 70 which is fixed to the tie rod 52. The control joint 70 may comprise a ball joint, or a pivot joint. The control joint 70 may at the inboard interface of the wheel 8. It may transform a transversal sliding motion of the actuator device 50 into a rotation of the wheel 8 in order to steer it. Consequently, the orientation of the wheel 8 may be controlled through the position of the control joint 70.

An upper arm 62 and a lower arm 64 may connect the wheel 8 to the structure of the bus, notably to the wheel housing 18 and the passenger platform 16. Pivot joints 66 may be used. As a consequence, the arms (62; 64) may oscillate about longitudinal axes in order to allow motion of the wheel 8 between the upper position and the lower position.

The upper arm 62 and the lower arm 64 may be wishbones. The upper arm 62 and the lower arm 64 may be joined to the steering knuckle at their outboard joints. The lower arm 64 may be linked to the longitudinal beam 30, which may be an outboard longitudinal beam 30, through the lower pivot joints 66. The longitudinal beam 30 may combine the hole 54 and the lower pivot joint(s) 66. The hole 54 may be above at least one or the lower pivot joint(s) 66.

A resilient element (not represented) and a damping device (not represented) may be joined to the upper arm 62 and the lower arm 64 in order to form the suspension system 34.

The current description refers to a single steering unit 32 18. However, the current teaching may apply to several, or to all the steering units 32 of the bus; respectively the vehicle.

Figure 4:
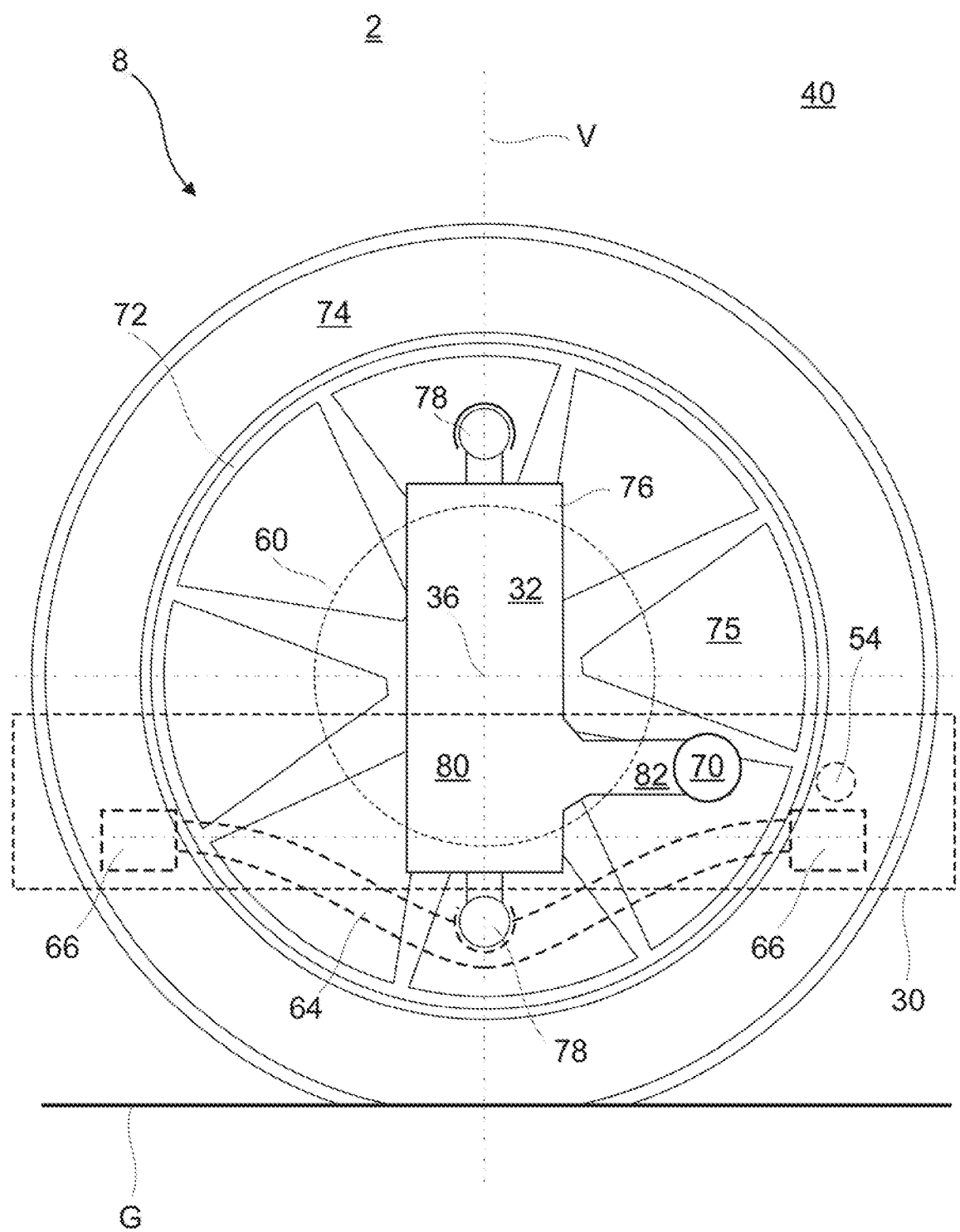
FIG. 4 provides a schematic illustration of a transversal view of a steering unit in accordance with a preferred embodiment of the invention.

FIG. 4 provides a schematic illustration of a transversal view of a steering unit 32. The steering unit 32 is represented from inside; for instance, from the centre line of the vehicle. The steering unit 32 may correspond to the ones as described in relation with FIGS. 2 and/or 3. For the sake of conciseness, the following description will be carried out in relation with one steering unit 32, however it could apply to several or to all the steering units of the vehicle, respectively the bus 2. The steering unit 32 is currently represented in an intermediate position, between the lower position and the upper position; which may be a maximal lower position and a maximal upper position respectively. The longitudinal beam 30 and the lower arm 64 are represented with doted lines for the sake of clarity.

The wheel 8 may comprise a rim 72 and a tire 74. The rim 72 may comprise a substantially rigid material such an alloy. The tire 74 may comprise resilient material(s), such as rubber. The rim 72 and the tire 74 may define an annular chamber which is inflated. The inflating pressure reduces the flat of the tire 74 against the ground G. The rim 72 may exhibit an inner cavity 75 about the rotation axis 36.

The steering unit 30 may comprise a steering knuckle 76. The steering knuckle 76 may comprise/be a king pin. The steering knuckle 76 may be housed in the inner cavity 75 of the rim 72, possibly totally. The rim 74 may be joined to the steering knuckle 76 by a rotating joint. The knuckle 76 may be within the wheel 8, for instance within the rim 74. The steering knuckle 76 may be linked to the upper arm and to the lower arm 64 by joints, for instance ball joints 78. Consequently, the steering knuckle 76 and the wheel 8 may pivot about a vertical axis V passing through the centres of the ball joints 78. The or each ball joint 78 may be replaced by a pivot joint, or a set of pivot joints. As an alternative to ball joints 78, pivot joints may be used. By way of illustration, one ball joint is replaced by two pivot joints.

The engine, notably the in-wheel engine 60, may be an electric engine. It may be adapted for rotating the wheel 8 about the rotation axis 36, in order to drive the bus 2. The in-wheel engine 60 may be fixed to the steering knuckle 76. It may be encircled by the rim 74. It may be at distance from the rim 74, for instance contact free therewith. The rotation axis 36 of the wheel 8 may correspond to the one of the in-wheel engine 60.

The steering knuckle 76 may comprise a main body 80, for instance between the upper and lower ball joints 78. It may additionally comprise a lever 82. The main body 80 may be vertically larger than the in-wheel engine 60. The lever 82 may project from the main body 80. It may be perpendicular to the vertical axis V about which the steering knuckle 76 swivels. An end, for instance a free end, of the lever 82 may be linked to the actuator mechanism (not represented), for instance at the control joint 70.

The length and/or the orientation of the lever 82 may be adapted in order to get around the in-wheel engine 60. Thus, the control joint 70 may be at distance from the in-wheel engine 60. It may be at a greater radius with respect to the rotation axis 36. The lever 82 may be longitudinally offset with respect to the in-wheel engine 60. The radius about the vertical axis V of the lever 82 may be larger than the outer radius about the rotation axis 36 of the in-wheel engine 60. Thus, the torque of the actuator on the knuckle is increased.

The lever 82 is angularly level the in-wheel engine 60 with respect to the rotation axis 36. They are substantially at overlapping angular position about the rotation axis 36. The lever 82 radially overlaps the in-wheel engine 60. The in-wheel engine 60 radially extends along the lever 82 from the rotation axis.

The hole 54 crosses the longitudinal beam 30. The hole may be a transversal hole 54. It may be crossed by the actuator mechanism (not represented). The hole 54 may be above the pivot 66. In the current configuration it may be vertically level with the control joint 70. The transversal hole 54 may face the wheel 8. It may transversally face the tire 74. It may be opened toward a side flange of the tire 74. Alternatively, the hole may face the rim 72, or at least the inner cavity 75.

The hole 54 is disposed at mid thickness of the beam 30, and more generally of the passenger platform. The vertical centre of the beam 30, respectively of the passenger platform, is vertically level or in the hole 54. Thus, stiffnesses of the beam and the passenger platform are promoted. This configuration optimises compactness and strength of the vehicle.

The current description refers to a single steering unit 32 18. However, the current teaching may apply to several, or to all the steering units 32 of the bus; respectively the vehicle.

Figure 5:
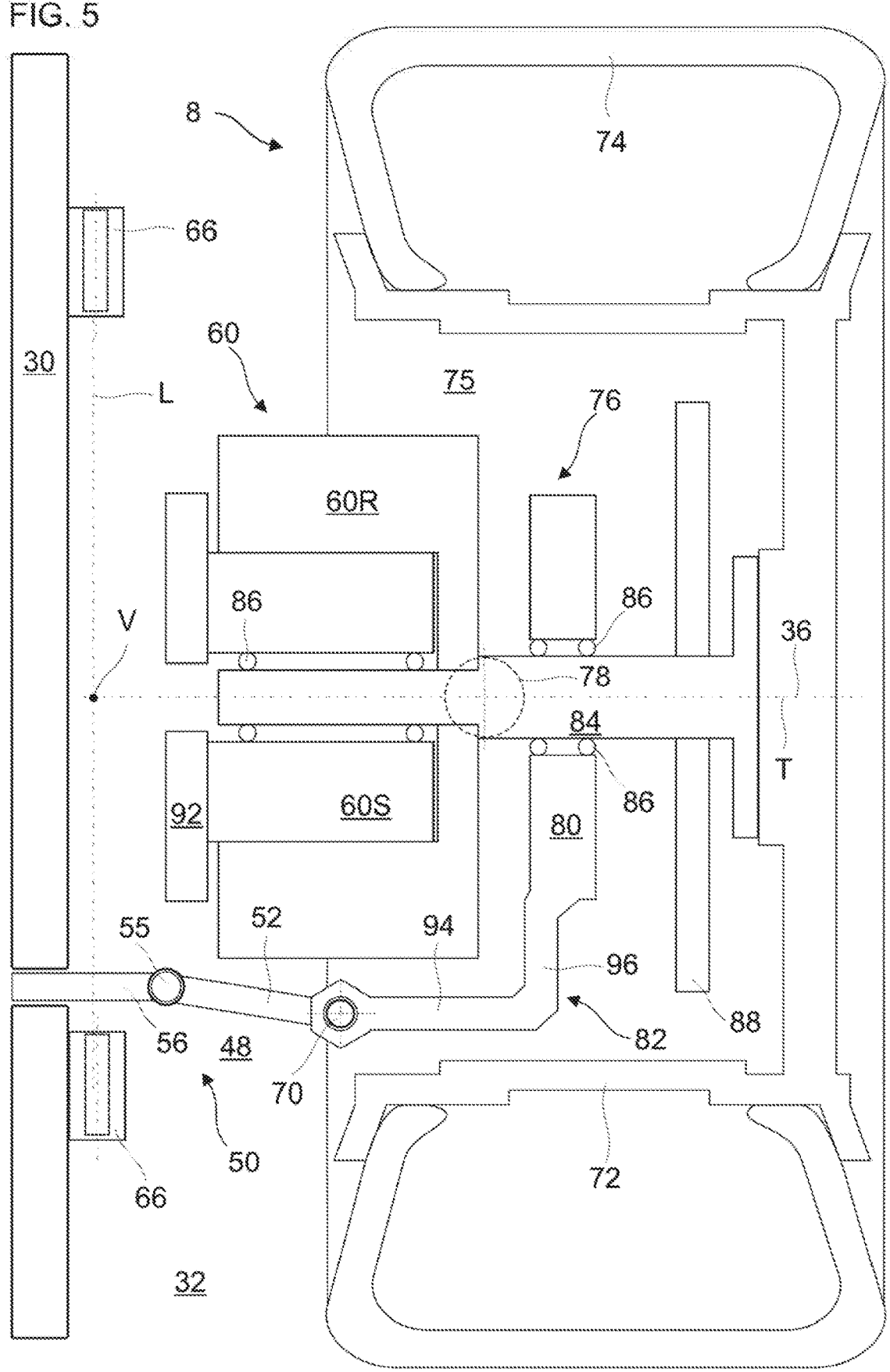
FIG. 5 provides a horizontal cut out of a steering unit in accordance with a preferred embodiment of the invention.

FIG. 5 provides a schematic illustration of a steering unit 32 in accordance with the invention. The steering unit 32 may correspond to the ones as described in relation with any one of the FIGS. 2 to 4.

In the current illustration, the transversal rotation axis 36 and the transversal axes T are aligned. However, the transversal rotation axis 36 may be pivoted about the vertical axis V. Then, the angle between the longitudinal axis L and the transversal rotation axis 36 may vary during steering manoeuvre.

The longitudinal beam 30 may extend along the wheel 8. The longitudinal beam 30 may support pivot joints 66 to which the lower arm (not represented) is linked. The hole 54, notably the transversal hole, may cross transversally the longitudinal beam 30.

The steering unit 32 may comprise a shaft 84. The shaft 84 may be fixed to the wheel 8, notably to the rim 72. The shaft 84 may extend outside the wheel 8, for instance outside the inner cavity 75 of the rim 72. The shaft 84 may cross the steering knuckle 76, notably the main body 80. The shaft may cross the in-wheel engine 60. The shaft 84 may be rotatably mounted to the steering knuckle 76. Bearings 86 may be provided at the rotating interfaces.

The steering unit 32 may comprise a brake disk 88. The brake disk 88 may be fixed to the shaft 84, and notably to the rim 72. The brake disk 88 may be disposed in the rim 72. A brake calliper (not represented) may comprise brake pads which are pressed against the opposite disk surfaces of the brake disk 88 in order to brake the wheel rotation, and to stop and to reduce the bus speed. The brake calliper may be fixed to the steering knuckle 76.

The in-wheel engine 60 may comprise a rotor 60R and a stator 60S. The rotor 60R may be fixed to the shaft 84 and may be at distance from the steering knuckle 76. The steering knuckle 76 and the rotor 60R may be contact free.

The steering knuckle 76 may comprise an inboard plate 92. The inboard plate 92 may be disposed transversally between the longitudinal beam 30 and the in-wheel engine 60. The stator 60R may be fixed to said inboard plate 92. The stator 60S may be contact free with the shaft 84. The inboard plate 92 may be connected to the main body 80 by means of transversal connections (not represented), which may be above and below the in-wheel engine 60. The in-wheel engine 60 may be sandwiched between the inboard plate 92 and the main body 80.

In the current embodiment, the rotor 60R is disposed around the stator 60S, however the contrary is also considered by the invention. Similarly, it is considered to place the stator toward the brake disk 88, and the rotor 60R toward the longitudinal beam 30. The in-wheel engine 60 may be partially in the wheel 8. Consequently, the in-wheel engine 60 may comprise a transversal portion outside the inner cavity 75, and an outboard portion within the inner cavity 75.

The position of the ball joints 78 is represented in dotted lines. Along the transversal rotation axis 36, the centre of the ball joints 78 may be disposed between the main body 80 and the in-wheel engine 60.

The actuator mechanism 48 may be represented through the tie rod 52 which is linked to the sliding bar 56 of the actuator device 50, the tie rod 52 which is linked to the sliding bar 56 may be linked by a ball joint 55. A control unit with a computer (not represented) may control the actuator mechanism 48. Since the tie rod 52, the upper arm and the lower arm may be of different lengths, the control unit may compensate for steering deviations due to the angle oscillations of the upper arm and the lower arm. Compensation due to the different positions of the pivot joints 66 and the ball joint 55 may be considered.

The lever 82 may comprise a transversal portion 94. The transversal portion 94 may extend mainly along the transversal direction T and/or the transversal rotation axis 36. The inboard end of the transversal portion 94 may receive the control joint 70. Said inboard end, and thus the control joint 70, may be along the in-wheel engine 60. The in-wheel engine 60 may overlap the control joint 70. The control joint 70 may be at a greater distance from the transversal rotation axis 36 than the in-wheel engine 60. The first longitudinal portion 96 may project perpendicularly to the main body 80, for instance perpendicularly to the transversal rotation axis 36. The control joint 70 may be astride a radial flange of the tire 74. The current arrangement optimizes the steering angle and space dedicated to the in-wheel engine 60. Thus, several engine configurations are allowed, and different engine performances are offered. The main body 80 may be longitudinally at distance from at least longitudinal portion, for instance the first longitudinal portion 96.

The lever 82 may comprise a longitudinal portion 96, for instance a first longitudinal portion 96. The first longitudinal portion 96 may connect the main body 80 to the transversal portion 94, for instance at the outboard transversal end thereof. The first longitudinal portion 96 may project longitudinally along the in-wheel engine 60. It may project away from the rotation axis 36.

The current description refers to a single steering unit 32. However, the current teaching may apply to several, or to all the steering units 32 of the bus; respectively the vehicle.

Figure 6:
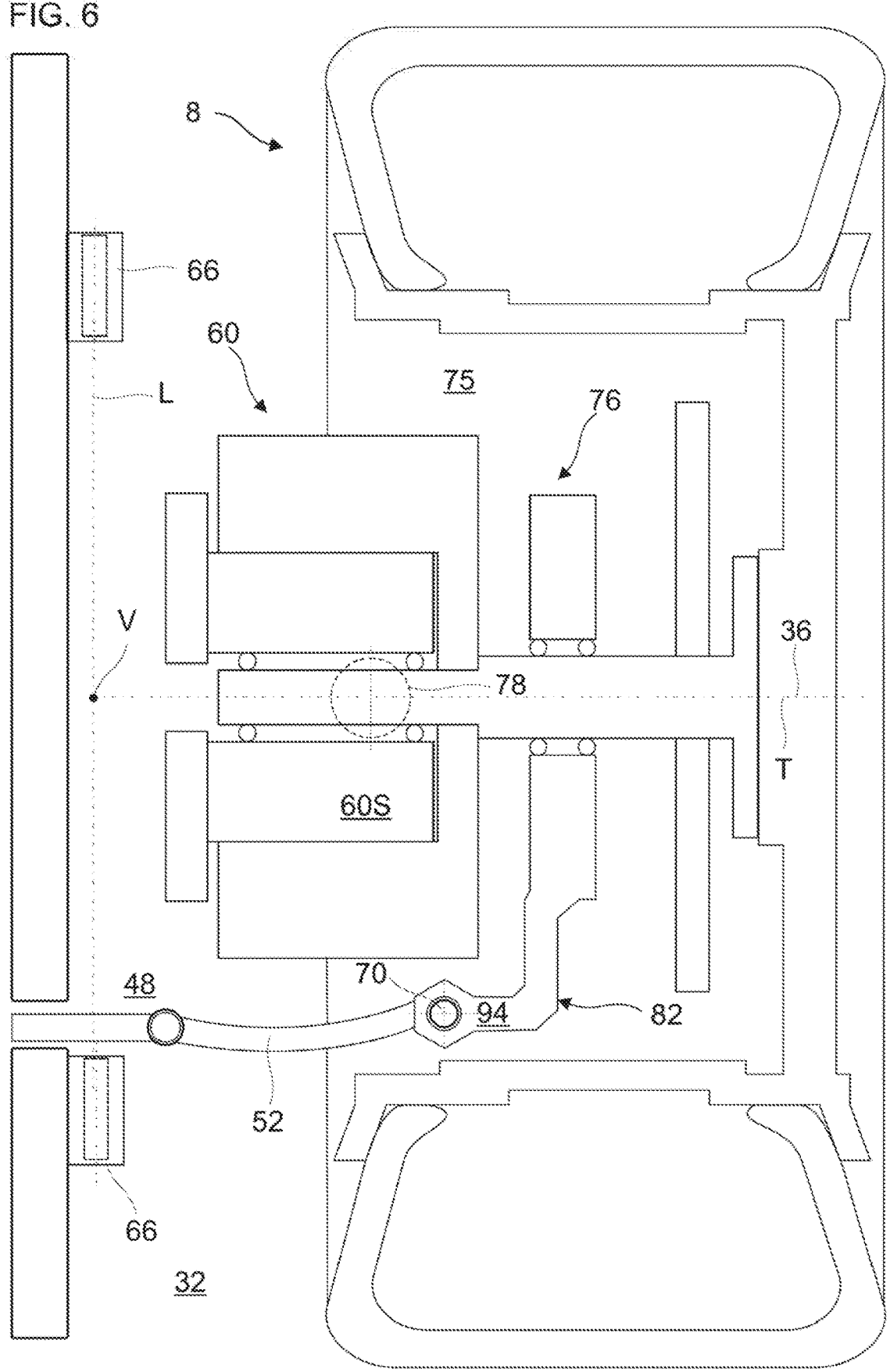
FIG. 6 provides a horizontal cut out of a steering unit in accordance with a preferred embodiment of the invention.

FIG. 6 provides a schematic illustration of a steering unit 32 in accordance with the invention. The current steering unit 32 may be similar or identical to the one as described in relation with FIG. 5.

The steering unit 32 may comprise a transversal axis T, a longitudinal axis L, a steering knuckle 76 with an in-wheel engine 60 exhibiting a transversal rotation axis 36 which is arranged transversally with respect to the longitudinal axis L. The steering unit 32 may further comprise an actuator mechanism 48 adapted for pivoting the steering knuckle 76 and the wheel 8 rotatably coupled thereon. The steering knuckle 76 may comprise a lever 82 which is linked to the actuator mechanism 48 and which includes a transversal portion 94 extending transversally along the in-wheel engine 60.

As an option, the longitudinal axis L and the transversal axis T may be generalized to a first axis and to the second axis which is inclined with respect to the first axis. The longitudinal axis L and the transversal axis T may be perpendicular to each other, and notably perpendicular to a vertical axis V.

The steering unit 32 in accordance with FIG. 6 may differ from the teaching of FIG. 5 in that the tie rod 52 is curved. Consequently, an in-wheel engine 60 with a greater outer diameter may be used. An in-wheel engine with a varying outer diameter too. The total width along the rotation axis 36 may also be increased. Then the maximum power of the in-wheel engine 60 may be increased. According to another advantage, the portion of in-wheel engine 60 outside the wheel 8 may be increased, and the portion of the in-wheel engine 60 inside the wheel 8, namely within the inner cavity 75, may be reduced. Consequently, more place remains in the inner cavity 75, for instance for the brake calliper (not represented). Indeed, the brake calliper may require a powerful second engine at distance from the in-wheel engine 60 which drives the wheel 8.

By contrast with FIG. 5, the transversal portion 94 may be shorter. The control joint 70 may be totally in the inner cavity 75. It may be at an end of the in-wheel engine 60, and possibly at an end of the stator 60S. Along the transversal rotation axis 36, the tie rod 52 may project over the majority of the in-wheel engine 60.

The position of the ball joints 78 is represented in dotted lines. The centre of the ball joints 78 may be disposed within the in-wheel engine 60 along the transversal rotation axis 36. Then, the wheel 8 requires less space for pivoting during its steering motions. The positions of the pivot joints 66 along the longitudinal beam 30 may be adapted. Their vertical positions may be adapted as well. The centre of the ball joints 78 may be inward by comparison with the control joint 70.

The current description refers to a single steering unit 32 18. However, the current teaching may apply to several, or to all the steering units 32 of the bus; respectively the vehicle.

Figure 7:
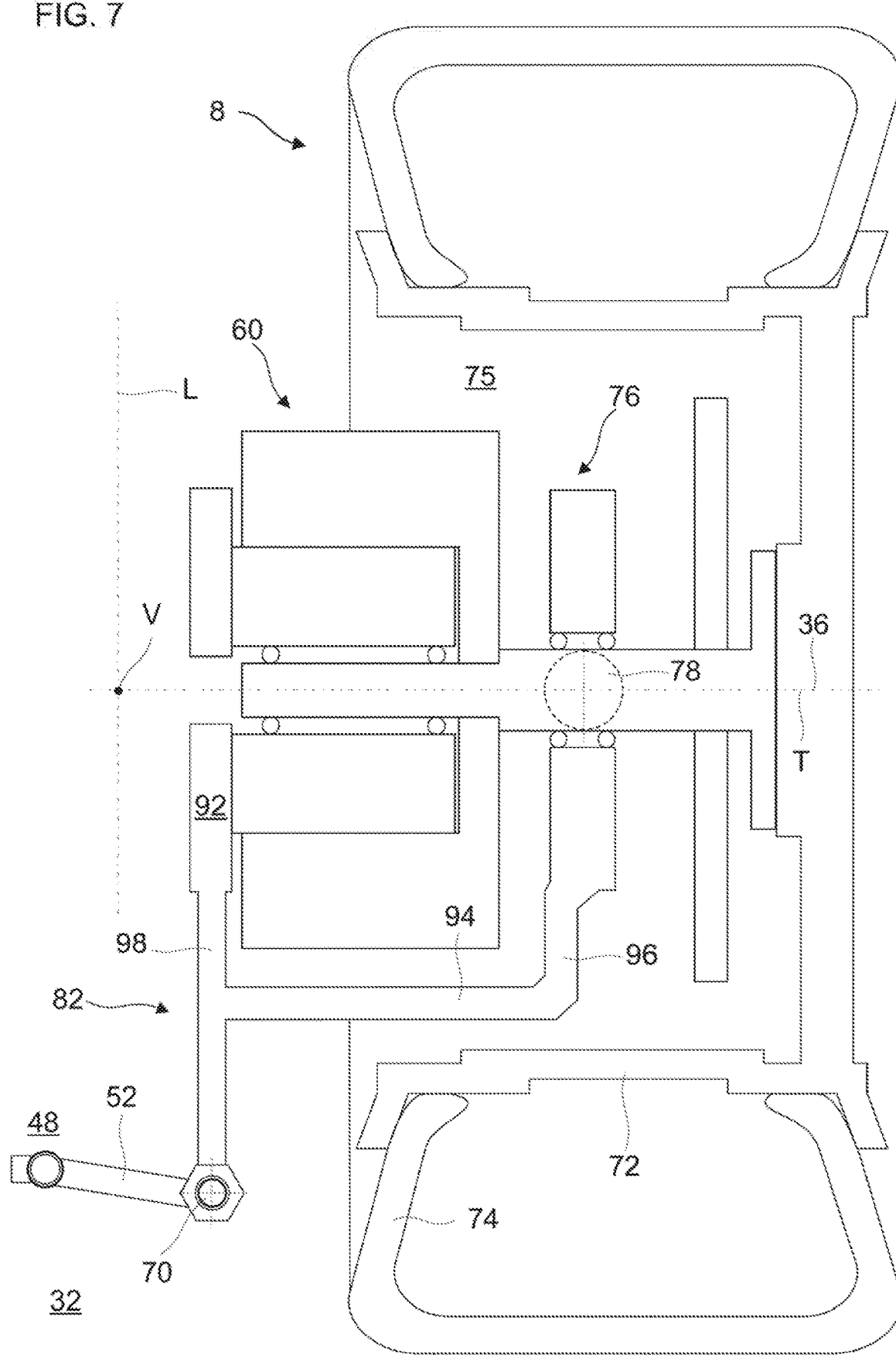
FIG. 7 provides a horizontal cut out of a steering unit in accordance with a preferred embodiment of the invention.

FIG. 7 provides a schematic illustration of a steering unit 32 in accordance with the invention. The steering unit may be similar or identical to the ones as described in relation with FIGS. 5 and 6. The steering unit 32 may comprise a transversal axis T, a longitudinal axis L, a steering knuckle 76 with an in-wheel engine 60 exhibiting a transversal rotation axis 36 which is arranged transversally with respect to the longitudinal axis L. The steering unit 32 may further comprise an actuator mechanism 48 adapted for pivoting the steering knuckle 76 and the wheel 8 rotatably coupled thereon. The steering knuckle 76 may comprise a lever 82 which is linked to the actuator mechanism 48 and which includes a transversal portion 94 extending transversally along the in-wheel engine 60.

The lever 82 may include a second longitudinal portion 98. The second longitudinal portion 98 may project from the outboard plate 92. The first longitudinal portion 96 and the second transversal portion 98 may be connected by the transversal portion 94. The longitudinal portions 96 and 98 may embrace the in-wheel engine 60. The control joint 70 may be at a longitudinal end of the second longitudinal portion 98. The second longitudinal portion 98 may be outside the wheel 8, notably outside the inner cavity 75. It projects longitudinally along the in-wheel engine 60, the rim 72, and possibly the tire 74 in form of which the control joint 70 may be disposed.

The position of the ball joints 78 is represented in dotted lines. Along the transversal rotation axis 36, the centre of the ball joints 78 may be disposed within the main body 80, and notably at distance from the in-wheel engine 60.

The current description refers to a single steering unit 32. However, the current teaching may apply to several, or to all the steering units 32 of the bus; respectively the vehicle.

Figure 8:
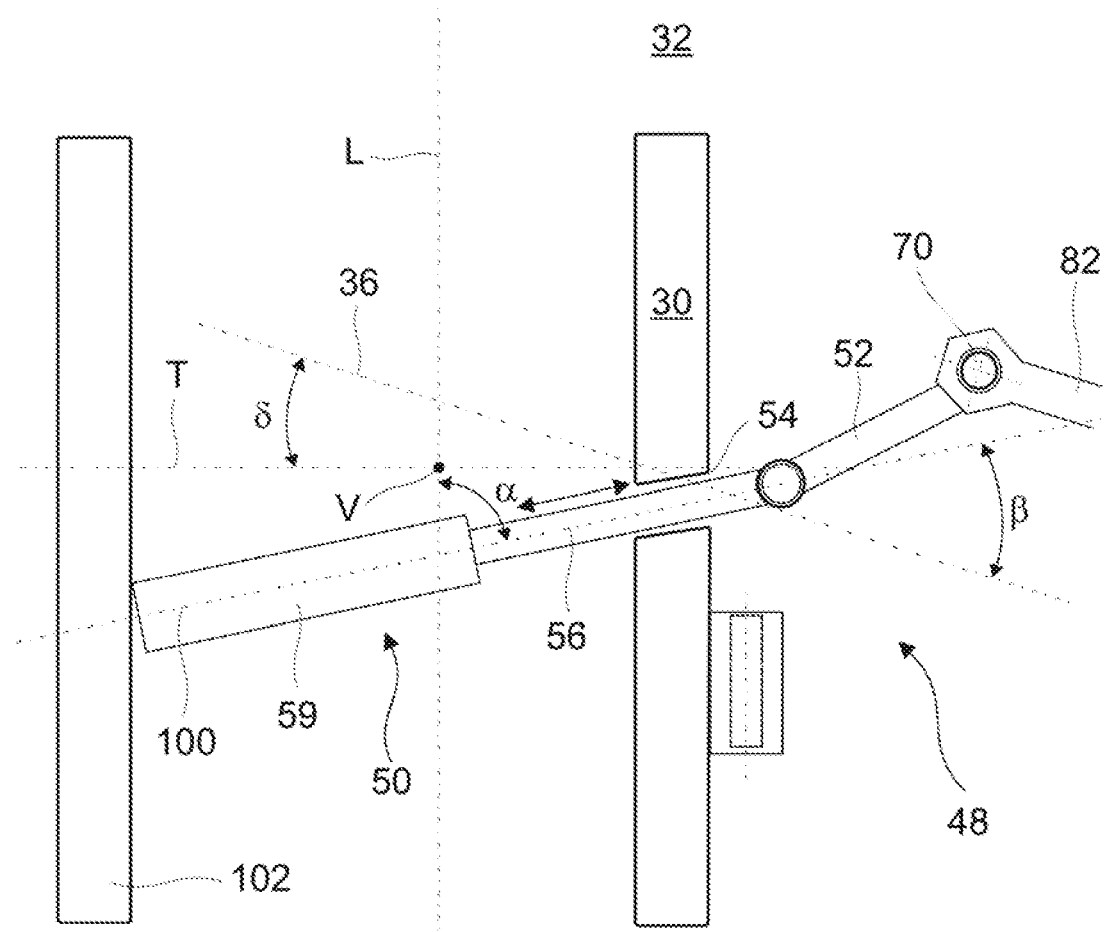
FIG. 8 provides a horizontal cut out of a steering unit in accordance with a preferred embodiment of the invention.

FIG. 8 provides a schematic illustration of angles in a steering unit 32. The steering unit 32 may correspond to the ones as described in relation with FIGS. 2 to 7. The longitudinal axis, the transversal axis T and the vertical axis V are provided. The current illustration may be an aerial view.

In the current illustration, the steering angle δ is increased, and substantially differs from 0° where the transversal rotation axis 36 and the transversal axis would be parallel. The steering angle δ may correspond to the inclination between the transversal rotation axis 36 and the transversal axis T. The steering angle δ may vary from −20° to +20°, possibly −30° to +30°. The position of the currently illustrated transversal rotation axis 36 may be illustrative in order to define angles of the steering unit 32.

The actuator device 50 of the actuator mechanism 48 may comprise a sliding direction 100 along which an entity moves. The main part 58 may be fixed to a second longitudinal beam 102, notably an inboard longitudinal beam. The sliding bar 56 may slide along said sliding direction 100. The transversal hole 54 may be oriented along the sliding direction 100. The sliding direction 100 may be inclined with respect to the longitudinal axis L of an angle (α) ranging from 45° to 80°, preferably from 60° to 75°. The sliding direction 100 may be inclined with respect to the transversal axis T of at most 20°, or 10°. The sliding direction 100 and the transversal rotation axis T may define an angle (β) ranging from 15° to 45° for the maximal values of the steering angle δ. The angle (β) may range from 0° to 30° when the steering angle δ is null, which means that the transversal rotation axis 36 and the transversal axis are aligned.

The current description refers to a single steering unit 32. However, the current teaching may apply to several, or to all the steering units 32 of the bus; respectively the vehicle.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A steering unit for a bus, the steering unit comprising:
a longitudinal axis;
a steering knuckle including
an in-wheel engine defining a transversal rotation axis which is transversally arranged with respect to the longitudinal axis,
a main body transversally disposed between the in-wheel engine and a brake disk, and
an inboard plate, wherein the in-wheel engine is disposed between the inboard plate and the main body;
a wheel rotation axis coaxial with the transversal rotation axis; and
an actuator mechanism adapted for pivoting the steering knuckle,
wherein the steering knuckle further includes a lever which is attached to the actuator mechanism and which includes a transversal portion extending along the in-wheel engine, and wherein the lever further includes a first longitudinal portion connecting the transversal portion to the main body, said first longitudinal portion extending longitudinally and radially along the in-wheel engine.

2. The steering unit in accordance with claim 1, wherein the lever further comprises a second longitudinal portion connecting the transversal portion to the main body, the in-wheel engine being transversally disposed between the first longitudinal portion and the second longitudinal portion.

3. The steering unit in accordance with claim 1, wherein the actuator mechanism includes an actuator device and a tie rod, said tie rod connecting the lever to the actuator device, and the transversal portion to the actuator device.

4. The steering unit in accordance with claim 1, wherein along the transversal rotation axis, the transversal portion includes an inboard end and an outboard end transversally at distance from the in-wheel engine.

5. The steering unit in accordance with claim 1, wherein the actuator mechanism is disposed below the transversal rotation axis, and vertically at distance from the wheel rotation axis.

6. The steering unit in accordance with claim 1, wherein the actuator mechanism includes a sliding bar with a sliding direction, the sliding direction and the transversal rotation axis define an angle ranging from 10° to 45°.

7. The steering unit in accordance with claim 1, wherein the steering unit comprises a wheel including an inner cavity, and the steering knuckle comprises an upper ball joint and a lower ball joint which are in said inner cavity, and which are vertically at distance from the transversal portion.

8. The steering unit in accordance with claim 1, wherein the steering unit includes a horizontal beam, said horizontal beam including a hole, the actuator mechanism being arranged in said hole, and a sliding bar of the actuator mechanism slides through said hole.

9. A bus, comprising:
a longitudinal axis,
a passenger platform, and
a steering unit, said steering unit including:
a steering knuckle including
an in-wheel engine defining a transversal rotation axis which is transversally arranged with respect to the longitudinal axis,
a main body transversally disposed between the in-wheel engine and a brake disk, and
an inboard plate, wherein the in-wheel engine is disposed between the inboard plate and the main body;

a wheel defining a wheel rotation axis coaxial with the transversal rotation axis of the in-wheel engine; and an actuator mechanism adapted for pivoting the steering knuckle, wherein the steering knuckle further includes a lever which is attached to the actuator mechanism and which includes a transversal portion extending along the in-wheel engine, and wherein the lever further includes a first longitudinal portion connecting the transversal portion to the main body, said first longitudinal portion extending longitudinally and radially along the in-wheel engine.

10. The bus in accordance with claim 9, wherein the steering unit is a first steering unit, said bus further comprising a plurality of second steering units identical to the first steering unit, the passenger platform connecting the first steering unit to the plurality of second steering units.

11. The bus in accordance with claim 9, wherein the actuator mechanism is arranged within a vertical thickness of the passenger platform, said vertical thickness of the passenger platform representing at most two times a vertical thickness of the actuator mechanism.

12. The bus in accordance with claim 9, wherein the passenger platform comprises a transversal hole, the actuator mechanism being connected to the steering knuckle through said transversal hole, said transversal hole being at mid thickness of the passenger platform.

13. The bus in accordance with claim 9, wherein the passenger platform includes a lower plate and an upper plate in contact with a beam to which the actuator mechanism is fixed, said upper plate forming a passenger floor of the passenger platform and spanning over at least half of a surface of a passenger compartment of the bus, the upper plate being spaced at most 40 cm from the ground.

14. The bus in accordance with claim 9, wherein the bus is an articulated bus comprising at least two articulated bodies, each of the at least two articulated bodies comprising at least eight identical steering units, wherein the steering knuckles are independently pivoted by their respective actuators mechanisms.

15. A steering unit, comprising:
a longitudinal axis;
a wheel defining a wheel rotation axis;
a steering knuckle including
    an in-wheel engine defining a transversal rotation axis which is coaxial with the wheel rotation axis
    a main body transversally disposed between the in-wheel engine and a brake disk, and
    an inboard plate, wherein the in-wheel engine is disposed between the inboard plate and the main body;
an actuator mechanism adapted for pivoting the steering knuckle;
the steering knuckle further including a lever which is coupled to the actuator mechanism, said lever including a transversal portion extending along the in-wheel engine with respect to the wheel rotation axis and a second longitudinal portion connecting the transversal portion to the main body and disposed angularly level with the in-wheel engine, and wherein the lever further includes a first longitudinal portion connecting the transversal portion to the main body, said first longitudinal portion extending longitudinally and radially along the in-wheel engine.

16. The steering unit in accordance with claim 15, wherein the transversal portion is longitudinally at distance from the body, the steering knuckle further comprises an auxiliary body transversally at distance from the main body; the first longitudinal portion is joined to the second longitudinal portion by the transversal portion; the second longitudinal portion being attached to the actuator mechanism.

17. The steering unit in accordance with claim 15, wherein the in-wheel engine is transversally disposed between the first longitudinal portion and the second longitudinal portion and the transversal portion radially extends along the in-wheel engine.

\* \* \* \* \*